US010277726B2

United States Patent
Mahalingam

(10) Patent No.: US 10,277,726 B2
(45) Date of Patent: Apr. 30, 2019

(54) MOBILE TO LANDLINE DIALER

(71) Applicant: Padmanabhan Mahalingam, Chennai (IN)

(72) Inventor: Padmanabhan Mahalingam, Chennai (IN)

( * ) Notice: Subject to any disclaimer, the term of this patent is extended or adjusted under 35 U.S.C. 154(b) by 0 days.

(21) Appl. No.: 15/439,126

(22) Filed: Feb. 22, 2017

(65) Prior Publication Data

US 2018/0241868 A1    Aug. 23, 2018

(51) Int. Cl.
| | | |
|---|---|---|
| *H04B 7/00* | (2006.01) | |
| *H04M 1/02* | (2006.01) | |
| *H04M 1/56* | (2006.01) | |
| *H04M 7/00* | (2006.01) | |
| *H04M 1/725* | (2006.01) | |
| *H04M 1/2745* | (2006.01) | |

(52) U.S. Cl.
CPC .......... *H04M 1/72527* (2013.01); *H04B 7/00* (2013.01); *H04M 1/0202* (2013.01); *H04M 1/274516* (2013.01); *H04M 1/56* (2013.01); *H04M 7/00* (2013.01); *H04M 2250/04* (2013.01)

(58) Field of Classification Search
CPC ...... H04M 1/247; H04M 1/56; H04M 1/7253; H04M 7/0069; H04M 2250/02; H04M 1/72527; H04M 1/0202; H04M 1/274516; H04M 2250/04; H04B 7/00
See application file for complete search history.

(56) References Cited

U.S. PATENT DOCUMENTS

| | | | | |
|---|---|---|---|---|
| 6,577,622 | B1 * | 6/2003 | Schuster | H04M 3/56 370/352 |
| 7,327,981 | B2 * | 2/2008 | Hundal | H04M 1/6033 455/41.2 |
| 7,363,045 | B2 * | 4/2008 | Rogalski | H04M 1/72502 379/428.02 |
| 8,019,380 | B2 * | 9/2011 | Lin | H04M 1/05 455/41.2 |
| 8,554,144 | B2 * | 10/2013 | Hanson | H04M 1/247 370/352 |
| 9,124,600 | B2 * | 9/2015 | Ku | H04W 4/16 |
| 2004/0072544 | A1 * | 4/2004 | Alexis | H04M 1/725 455/74.1 |
| 2005/0015516 | A1 * | 1/2005 | Ju | H04M 1/2535 709/250 |
| 2007/0263804 | A1 * | 11/2007 | Lai | H04M 1/725 379/93.05 |

(Continued)

FOREIGN PATENT DOCUMENTS

WO     WO 2005064813 A1 *  7/2005  .......... H04M 1/2535

*Primary Examiner* — Pablo N Tran

(74) *Attorney, Agent, or Firm* — Donald R. Boys; Central Coast Patent Agency LLC

(57) ABSTRACT

A landline-connected telephone has a landline connection to a publicly-switched telephone network, a processor executing coded instructions from a non-transitory data storage medium, and an input interface receiving data from a remote communication device. Through execution of the coded instructions, the landline-connected telephone receives a telephone number sequence by the near-field wireless circuitry, and generates required tones according to the telephone number sequence, dialing the telephone number over the landline connection.

5 Claims, 7 Drawing Sheets

(56) References Cited

U.S. PATENT DOCUMENTS

2009/0111518 A1* 4/2009 Agrawal .......... H04M 1/72502
 455/557
2009/0285184 A1* 11/2009 Watanabe .......... H04L 12/5692
 370/332

* cited by examiner

MOBILE TO LANDLINE DIALER

BACKGROUND OF THE INVENTION

1. Field of the Invention

The present invention is in the field of telephones.

2. Description of Related Art

Since their introduction, mobile phones have increasingly become a staple in the lives of many people. Users of mobile phones generally keep their phones on or near their person throughout course of the day due to their portable nature. For many users, mobile devices have become the sole place in which contacts are stored, and may find it inconvenient to contact people from their contacts list on a traditional landline telephone. Many people have adopted mobile phones as their main source of telephonic communication due to its convenience, even though significant advantages are still present on a landline system. Advantages a landline system may provide includes less likelihood of a dropped call due to bad cellular reception, call quality may be superior on a landline, and cost to conduct a call via landline may be less costly than on a mobile phone plan. In addition, there may be other benefits to getting more users to conduct calls via landline, for example reduced load on the operating wireless spectrum, resulting in less congestion and allowing more, and potentially more important, calls to get through. Therefore, what is clearly needed is a system which creates a bridge between a mobile handset and a landline.

BRIEF SUMMARY OF THE INVENTION

In one embodiment of the present invention, a landline-connected telephone is provided, comprising a landline connection to a publicly-switched telephone network, a processor executing coded instructions from a non-transitory data storage medium, and an input interface receiving data from a remote communication device. Through execution of the coded instructions, the landline-connected telephone receives a telephone number sequence by the near-field wireless circuitry, and generates required tones according to the telephone number sequence, dialing the telephone number over the landline connection.

In one embodiment, the input interface comprises a wired connection port. Also in one embodiment, the wired connection port is a USB port. Also in one embodiment the input interface comprises wireless connection circuitry. And in one embodiment, the wireless connection circuitry is one of Bluetooth™ or WiFi.

In one embodiment, a conversation conducted as a result of the dialed telephone number is conducted over the input interface. Also in one embodiment, a conversation conducted as a result of the dialed telephone number is conducted using a microphone and speaker of the landline-connected telephone. In one embodiment, the landline-connected telephone comprises a base, a charging cradle and a portable wireless handset. And in one embodiment, after receiving a telephone number to dial, dialing is delayed until the handset is picked up and the landline-connected smart phone is off hook.

In another aspect of the invention a method for dialing a call through a landline-connected telephone is provided, comprising the steps of receiving a telephone number to dial through interface circuitry from a remote communication device, and through execution of coded instructions on a processor, generating required dialing tones according to the telephone number sequence, through a landline connection to a publicly-switched telephone network.

In one embodiment of the method, the input interface receives a telephone number to dial through the input interface as a wired connection port. Also in one embodiment, the wired connection port is a USB port. Also in one embodiment the input interface receives a telephone number to dial through the input interface as a wireless connection circuit. And in one embodiment the wireless connection circuit is one of Bluetooth™ or WiFi.

In one embodiment, a conversation conducted as a result of the dialed telephone number is conducted over the input interface. Also in one embodiment, a conversation conducted as a result of the dialed telephone number is conducted using a microphone and speaker of the landline-connected telephone. And in one embodiment, after receiving a telephone number to dial, dialing is delayed until the handset is picked up and the landline-connected smart phone is off hook.

In another aspect of the invention a system for telephone communication is provided, comprising a landline-connected telephone having a landline connection to a publicly-switched telephone network, a first processor executing coded instructions from a non-transitory data storage medium, an input interface supporting communication with a remote portable communication device, a first microphone, and a first speaker, and a portable communication device having a second processor executing a software application, an output interface to the landline-connected telephone, a second microphone, a second speaker, and a contact list stored in a data repository. A contact is selected in the contact list, a phone number associated with the contact is transmitted to the landline-connected smart phone via the interfaces between the portable communication device and the landline-connected telephone, and the landline-connected telephone, through execution of the coded instructions, generates required tones according to the telephone number, and dials the telephone number over the landline connection.

DETAILED DESCRIPTION OF THE INVENTION

Generally, what is provided is a landline-connected smart telephone base that may connect with a user's mobile phone, enabling the user to initiate a call to a selected contact from a contact list stored on the mobile phone. In one embodiment of the invention the call is routed through the smart telephone landline base, and utilizes the landline to conduct the call.

In order to enable the features described herein, the user may be required to complete an initial step of connecting a mobile device to the smart telephone landline base, either physically or wirelessly. The user may also be required to undertake an authorization process, such as entering a randomly generated pairing personal identification number (PIN), or enabling settings and devices in an application specific to the smart telephone landline base that is executed from the memory of the mobile device.

Figure 1A:
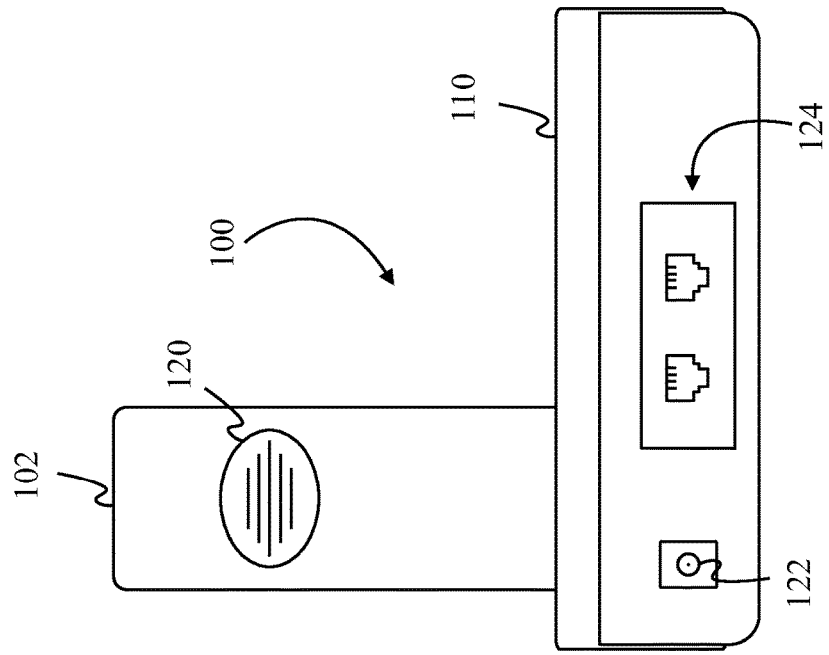
FIG. 1a is a frontal view of a smart telephone landline base according to one embodiment of the present invention.
Figure 1B:
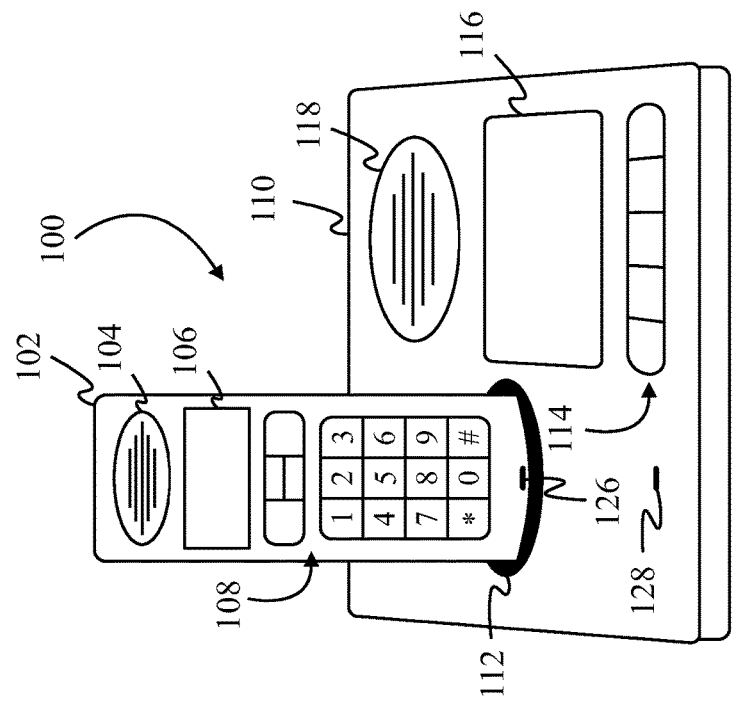
FIG. 1b is a back view of the smart telephone landline base of FIG. 1 according to one embodiment of the present invention.

FIGS. 1a and 1b show different perspectives of a smart telephone landline base 100. Smart telephone landline base 100 may have a handset 102 and a base station 110 according to one embodiment of the present invention. Appearance-wise, handset 102 and smart telephone landline base 110 may resemble any telephone currently available to consumers. Handset 102 may have a front speaker 104, a back speaker 120, a handset display 106, handset buttons 108, and handset microphone 126. Although only one handset is depicted in the drawing, it should be understood that multiple handsets may be paired with a single base. Furthermore, in another embodiment of the present invention, the smart telephone landline base may be a telephone base with a handset connected to the base by a wired connection.

Front speaker 104 may be functioning at a lower volume to allow a user to put their ear against it without discomfort. The function of speaker 104 may include listening to a telephone call, listening to messages left on a built-in answering machine, or to follow instructions for other various functions.

Back speaker 120 may be functioning at a higher power level than front speaker 104 in order to serve such functions as usage in speakerphone mode, broadcasting verbal instructions from the phone, or announcing a number of messages stored on the system.

Display 106 may be used to display various information pertaining to a telephone call, such as the amount of time that has elapsed since the start of the call, a telephone number that is dialed, or a name assigned to the number that is presently on the line. Outside of a call, display 106 may display other information such as current time, number of messages currently saved on the memory of the base, caller ID information for an incoming call, or may display a menu of items and settings that a user may access and change.

Handset 102 may include a set of handset buttons 108. Handset buttons 108 may include, but not be limited to, such buttons as a keypad to allow manual dialing of phone numbers, a button to activate the handset, a button to deactivate the handset, and buttons for menu navigation.

There may also be a handset microphone 126 to allow the telephone to pick up speech from the user. This may enable the user to, in addition to conducting verbal communication with whomever may be on the other end, activate functions using voice commands.

Smart telephone landline base 110 may comprise a base speaker 118, a base display 116, a set of base buttons 114, a handset charging cradle 112, a base microphone 128, a power port 122, and ports to plug in a telephone connection wire 124 which are depicted as RJ11 plugs in the illustration. It should be understood that the present inventive concept may be adapted to accept any line to work on a wide variety of telephone systems.

Base speaker 118 may function at a power level similar to handset back speaker 120 in order to allow a user to hear audio while at a distance. Base speaker 118 may be used for the same functions as rear speaker 120.

Base display 116 may function similarly to handset display 106, except it may be a larger display.

Base 110 may have a set of buttons 114. Buttons 114 may include, but not be limited to, a dedicated button to play and pause messages, skip current message, rewind or go back to previous message, delete message, save current message, and buttons used to navigate a menu that may be displayed on display 116. In some embodiments, base 110 may also have a keypad on the base and allow for dialing directly from the base.

Charging cradle 112 may have contacts (not shown) which, when a handset 102 is placed in cradle 112, aligns with contacts on handset 102 and provides electric power to charge handset 102. In other embodiments, charging cradle 112 may utilize inductive charging technology, which may have no visible contacts.

Base microphone 128 may be able to pick up audio cues from a user at a further distance than handset microphone 126 in order to enable the user to conduct a call using speaker phone, activating voice commands, or recording a greeting message for a built-in answering machine.

Power port 122 is present on the back side of base 110 in this example. Power port 122 may accept a plug from a DC adapter to provide power to base 110. In addition to being powered from port 122, base 110 may have an internal battery that is kept recharged by the power provided from port 122 allowing for continual usage in the event of loss of electricity.

Also on the back side of base 110 are connection ports 124 which may accept a telephone wire to connect to a landline. As mentioned above, the illustration depicts a standard RJ11 plug, but base 110 may be adapted to accept a plug of any telephone standard without deviating from the concept of the present invention. Examples of other telephone standards included BS 6312, F-010, and TAE connector.

Although FIGS. 1a and 1b illustrate a base and portable telephone system, it should be understood that the present invention is not limited to this particular type of landline telephone, and may be operable with any landline telephone that is adapted to execute software on a processor, and to connect wirelessly or physically with a smart cellular telephone.

Figure 2:
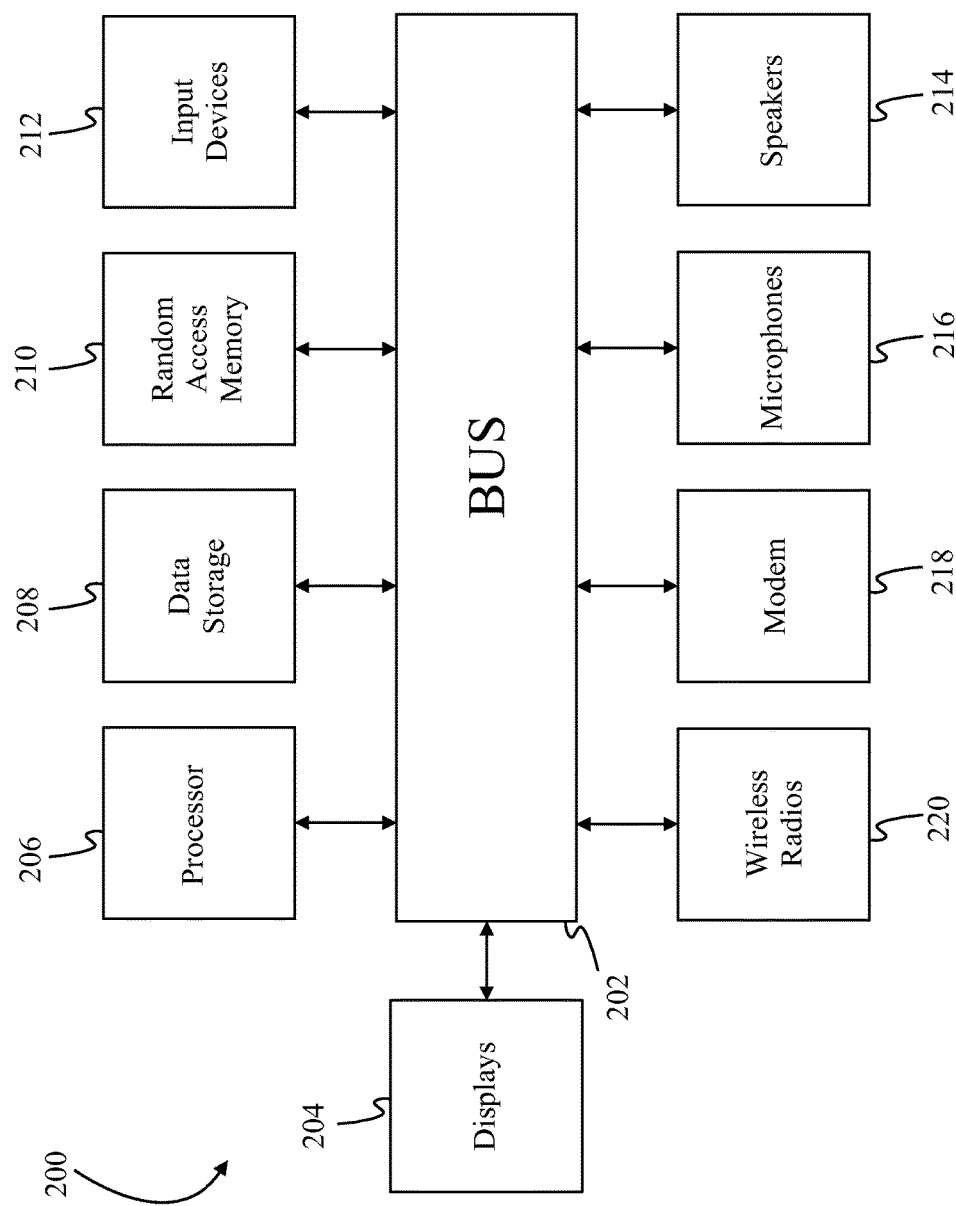
FIG. 2 is a block diagram of components of the smart telephone landline base of FIGS. 1 and 2 according to one embodiment of the present invention.

FIG. 2 is a block diagram of components of a smart telephone landline base 200 according to one embodiment of the present invention. The smart telephone landline base may have a data bus 202 to provide a means for various components to communicate with one another. Other components may include displays 204, a processor 206, data storage 208, random access memory (RAM) 210, input devices 212, speakers 214, microphone 216, modem 218, and wireless radios 220.

Displays 204 may, as described above, be used to display various information pertaining to statuses, menus, or information pertaining to a current or incoming call.

Processor 206 may be responsible for executing coded instructions that may be stored in data storage 208, or for managing operations of other components based on coded instructions. Examples of coded instructions may include an operating system, communication with a paired mobile device, activation of certain functions based on audio cue recognition, and generating of tones and signals to enable dialing of a sequence of numbers. Additionally, data storage 208 may store other items such as messages, contact information, and settings that may alter the functionality of the smart telephone landline base. Data storage 208 may be in any form of readable and writable memory commonly used in the art.

RAM 210 is used for caching purposes for various coded instructions to store and retrieve information, and may not be directly accessible by a user.

Input devices 212 may include buttons that may be present on a paired handset, such as handset 102, and present on the smart telephone landline base, such as in smart base 110. Additional input devices may include a paired mobile device.

Speakers 214 are responsible for broadcasting audio output from system 200. This may include speakers on the handset 102, or on the base 110. In contrast to speakers 214, microphones 216 are responsible for audio input. This may include the user talking with whomever may be on the other end of the line, or activating voice commands that may be built into the operating system of the smart telephone landline base.

Modem 218 may be responsible for connecting the system of smart telephone landline base 200 to a landline, and enable the smart telephone landline base to conduct and receive telephone calls.

Wireless radios 220 may include radios to allow the base to communicate with paired handsets, such as those that utilize, amongst other frequencies, 900 MHz, 2.4 GHz, 5.8 GHz frequencies. In addition, wireless radios 220 may include Bluetooth radio circuitry to allow pairing with a mobile device, and a WiFi radio to enable WiFi-Direct connections or connecting to a wireless network.

Figure 3:
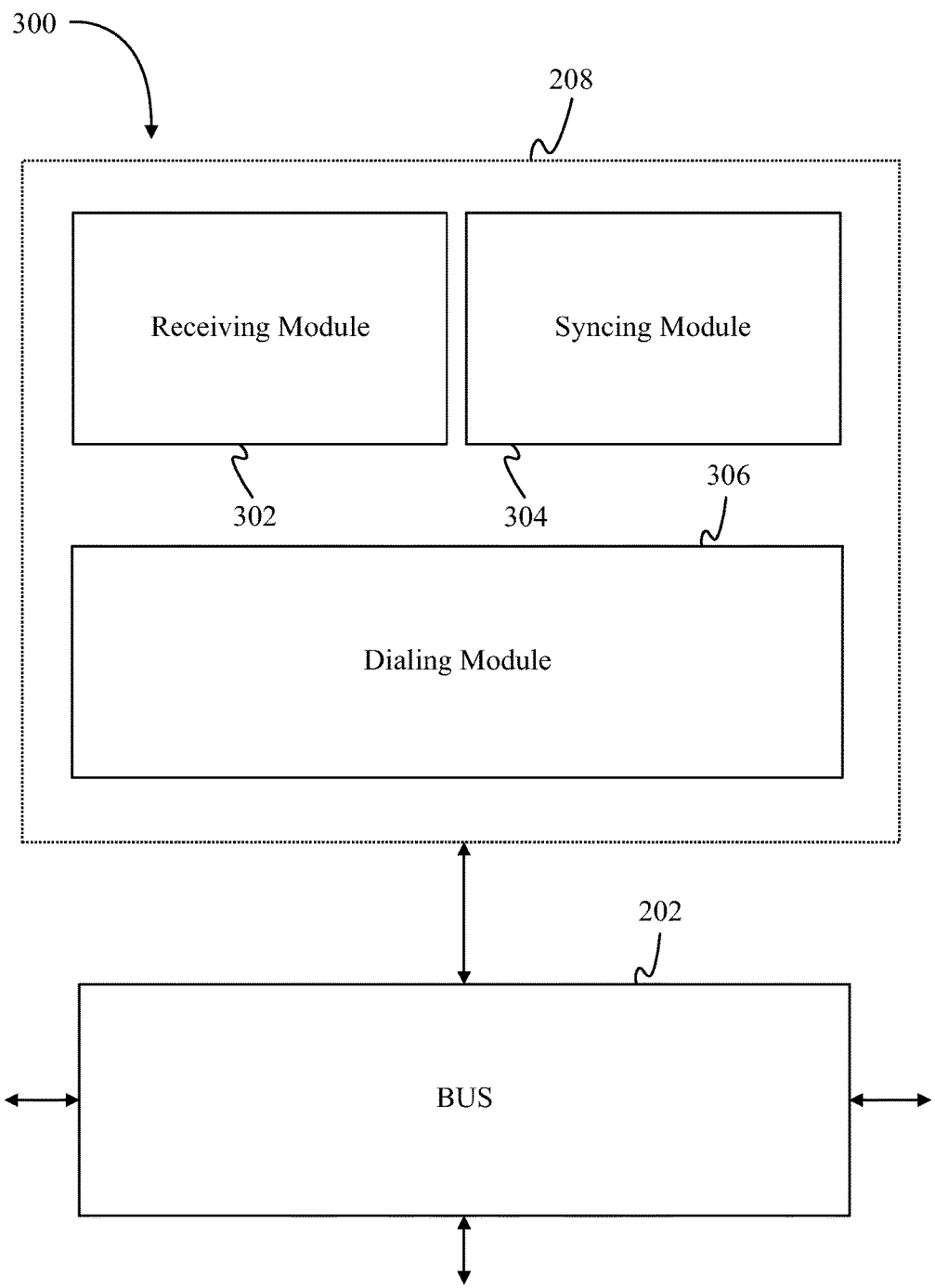
FIG. 3 is a block diagram of modules that may be present in the software for the smart telephone landline base according to one embodiment of the present invention.

FIG. 3 is a block diagram showing relevant software modules 300 according to one embodiment of the present invention. These are receiving module 302, syncing module 304, and dialing module 306. These software modules may be stored in the data storage 208 of the smart telephone landline base. Receiving module 302 handles the receiving of a contact number from a paired mobile device. Syncing module 304 handles syncing of a contact list from a mobile device to the data storage of the base. This allows the user to access their contacts list and make calls without having the paired mobile device nearby. Once a number has been received, it is passed on to dialing module 306 which handles the generation of tones and signals, such as dual-tone multi-frequency (DTMF) signals, that may be passed to a modem present in the base through bus 202 to complete a call which is routed through the landline.

Figure 4B:
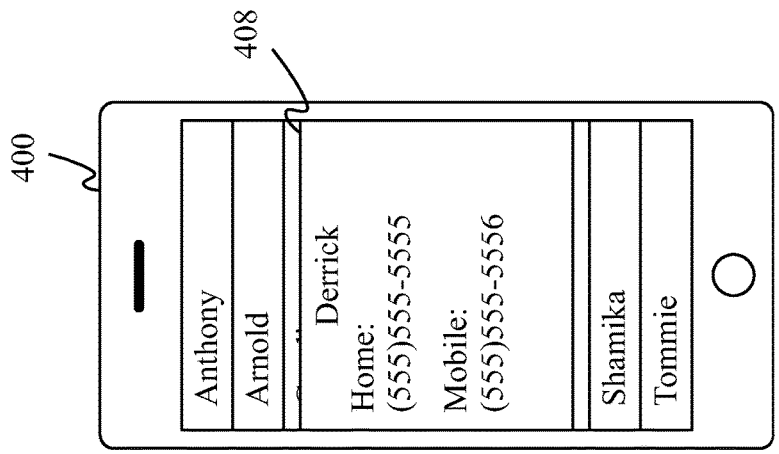
FIGS. 4a and 4b illustrates an interface for an application for a mobile device for dialing to the smart telephone landline base according to one embodiment of the present invention.
Figure 4A:
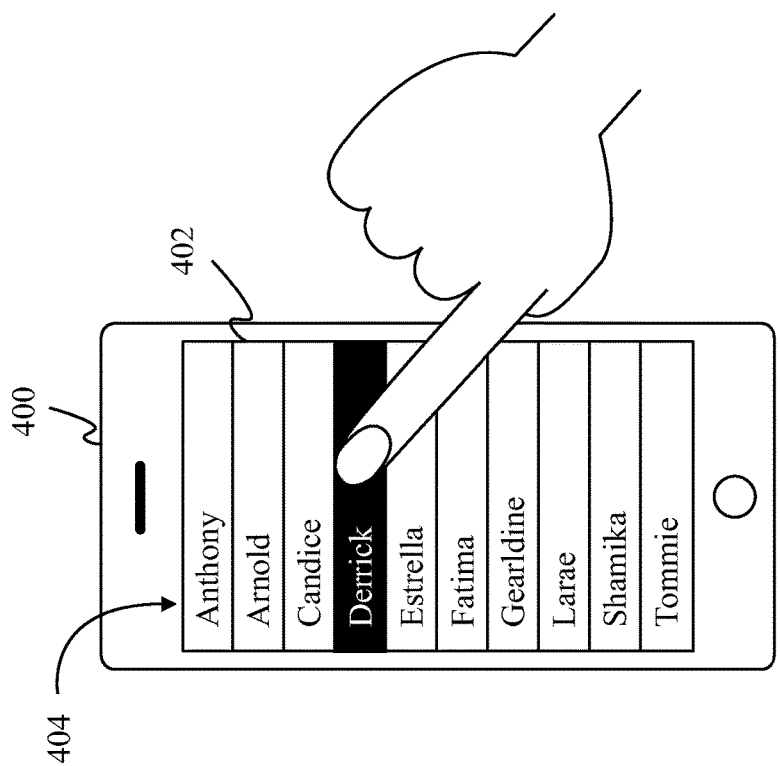

FIGS. 4a and 4b are illustrations of a procedure for selecting a contact to be dialed through a smart telephone landline base according to one embodiment of the present invention. The illustration shows a mobile device 400 having a touchscreen display 402. It is assumed in this procedure that mobile device 400 has previously gone through the initial set up steps of pairing with the smart telephone landline base. Once a user boots a special dialing application on the mobile device 400, the user is presented with a contacts list 404 presently stored in the memory of the mobile device 400. The user may scroll through the contact list, and select a contact by simply touching the name of the person displayed on touchscreen 402. In FIG. 4a, a contact saved as Derrick is selected. Upon selecting a contact, a new window may appear and show a list of numbers assigned to that specific contact. The user may then select any of the numbers to initiate the call.

It should be understood that any mobile device may be used, as long as it is capable of pairing with a smart telephone landline base as described herein, and can run the special application. This may include any smartphone, such as Apple Computer's iPhone, iPad, and iPod devices as well as any smartphone that utilizes Google's Android operating system; or feature phones that have the special application pre-installed. In some embodiments, the functions of the described application may be built into the operating system. In this case, upon finalizing on a number to dial, the user may be prompted with a menu of options in which to conduct the call, be it through the cellular service or through the landline.

Figure 5:
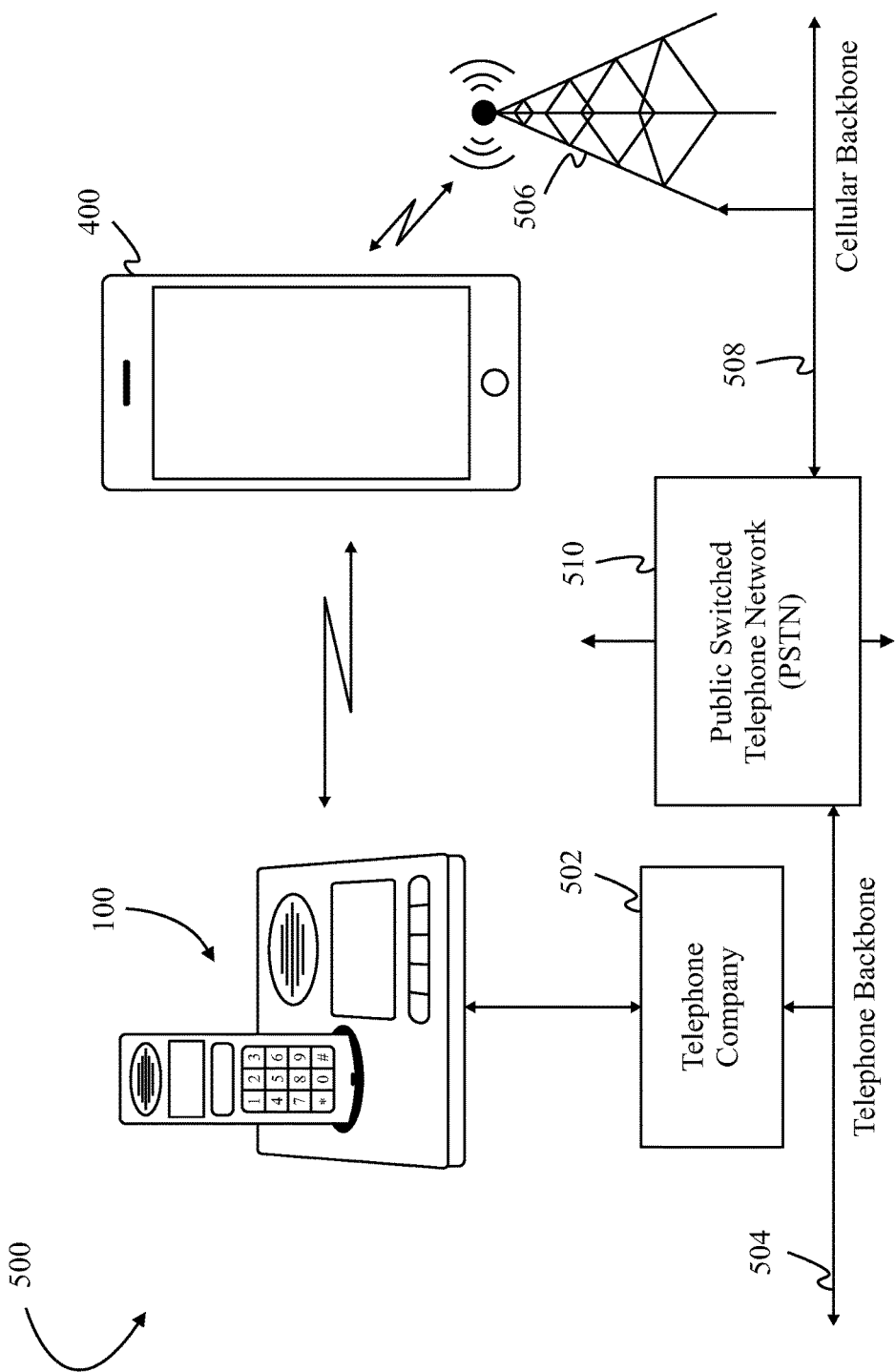
FIG. 5 is an architectural diagram of a system utilizing a smart telephone landline base according to one embodiment of the present invention.

FIG. 5 is an architectural diagram of components of a system 500 implementing a smart telephone landline base according to one embodiment of the present invention. Locally, system 500 may comprise at least a smart telephone landline base 100 and a mobile smartphone 400. Smart telephone landline base 100 may pair with mobile device 400 through various means, including Bluetooth, WiFi, or directly connecting through a cable, such as a USB cable. Once paired, smart telephone landline base 100 and mobile device 400 may communicate through an application that may be installed on mobile device 400, using wireless pairing circuitry. Smart telephone landline base 100 may, additionally, be connected to one or more handsets.

On the infrastructure side, smart telephone landline base 100 may be connected to a telephone company 502 via a landline. Telephone company 502 is connected to a telephone backbone 504, which connects to a public switched telephone network (PSTN) 510 to enable a broad communication reach. Mobile device 400 may be connected to a cellular provider tower 506, which may be connected to a cellular backbone 508. Cellular backbone may also be connected to the same PSTN 510 as telephone backbone 504.

Figure 6:
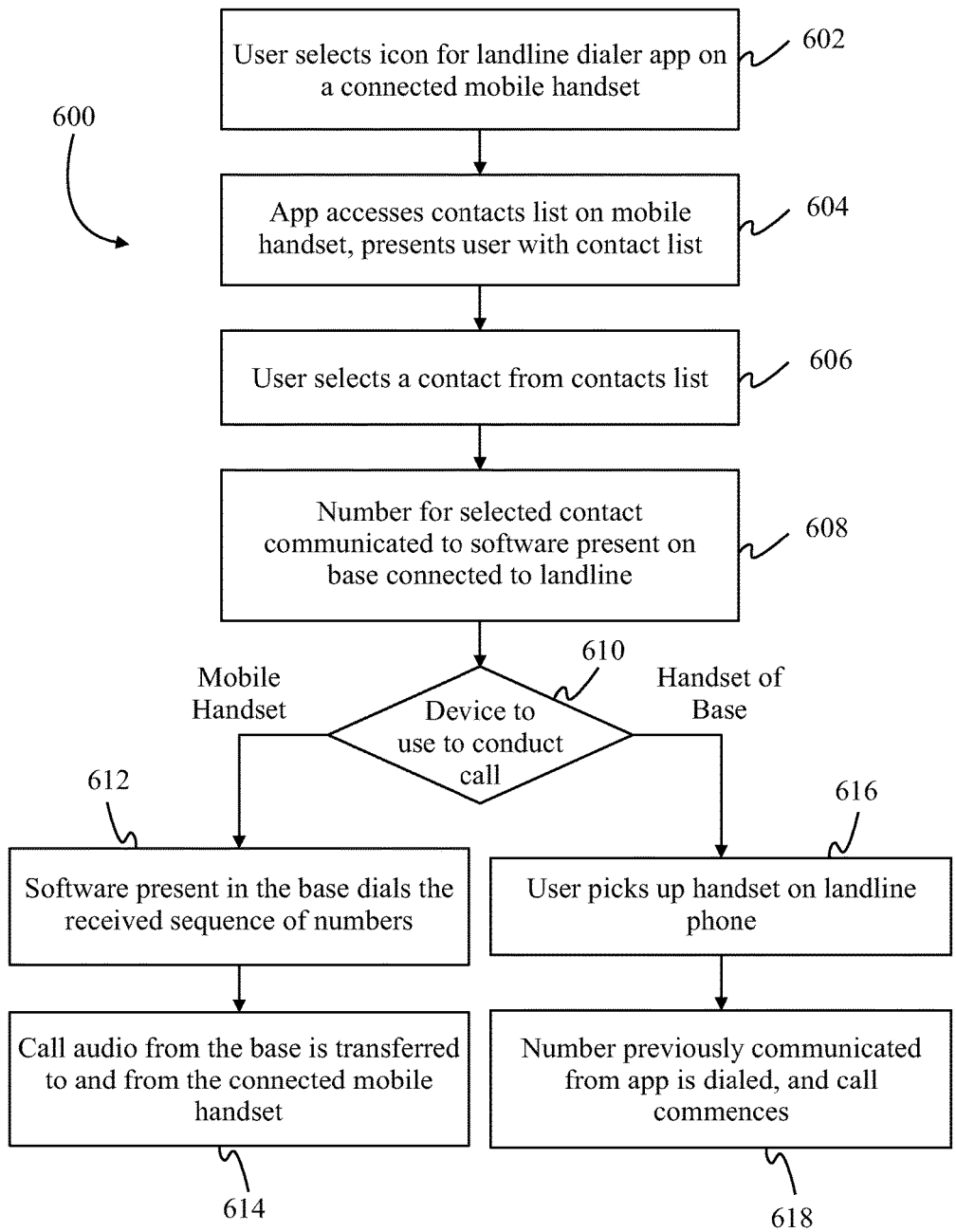
FIG. 6 is a flowchart for a method of dialing a number using a separate application on a mobile cellular device according to one embodiment of the present invention.

FIG. 6 is flowchart 600 detailing steps of dialing a contact from a mobile device through a smart telephone landline base by using an application according to one embodiment of the present invention. It should be understood that the steps of flowchart 600 takes place after an initial setup procedure, as detailed in another part of the present specification. At step 602 a user of a mobile device boots an application designed to communicate with a smart telephone landline base. The user may boot the application by, for example, touching an icon on a touchscreen that may be present on the mobile device, or choosing the application from a list by using keys designated for navigating a menu. At step 604, the application accesses the contact list stored on the mobile device's memory. The user is presented with a list of contacts, and at step 606 the user may select a contact to dial. Upon selecting a contact, the user may be prompted to confirm dialing the presently selected contact. In another embodiment, the user may be presented with a page that shows details of the selected contact, and, along with the option to dial, the user may be able to perform other various functions on the contact, such as, editing a phone number, designating a picture for the contact, or add notes pertaining to the contact. At step 608, after the user has confirmed dialing the selected contact, the number for the contact is communicated to a landline-connected smart telephone base. In some embodiments, at step 610 the user may be given a choice: conduct the call using the speaker and microphone present on the mobile device, or use a handset present on the smart base. If the user chooses to conduct the call with the mobile device, control goes to step 612, and software executing in the smart telephone landline base dials the number of the selected contact. At step 614, the call session is conducted using the speaker and microphone of the mobile device.

Returning to step 610, if the user chooses to use the handset that may be present on the smart telephone landline base, control goes to step 616. An example scenario in which this is a desirable case is the mobile device is presently plugged in to charge. At step 616, the call is on hold until the user picks up the handset of the smart base. At step 618, after the user picks up the handset of the smart base, the call is dialed by the software executing on the smart telephone landline base, and the call commences. In some embodiments, the smart telephone landline base may start the call in speaker-phone mode, and may commence dialing without the need for the user to pick up the handset.

Figure 7:
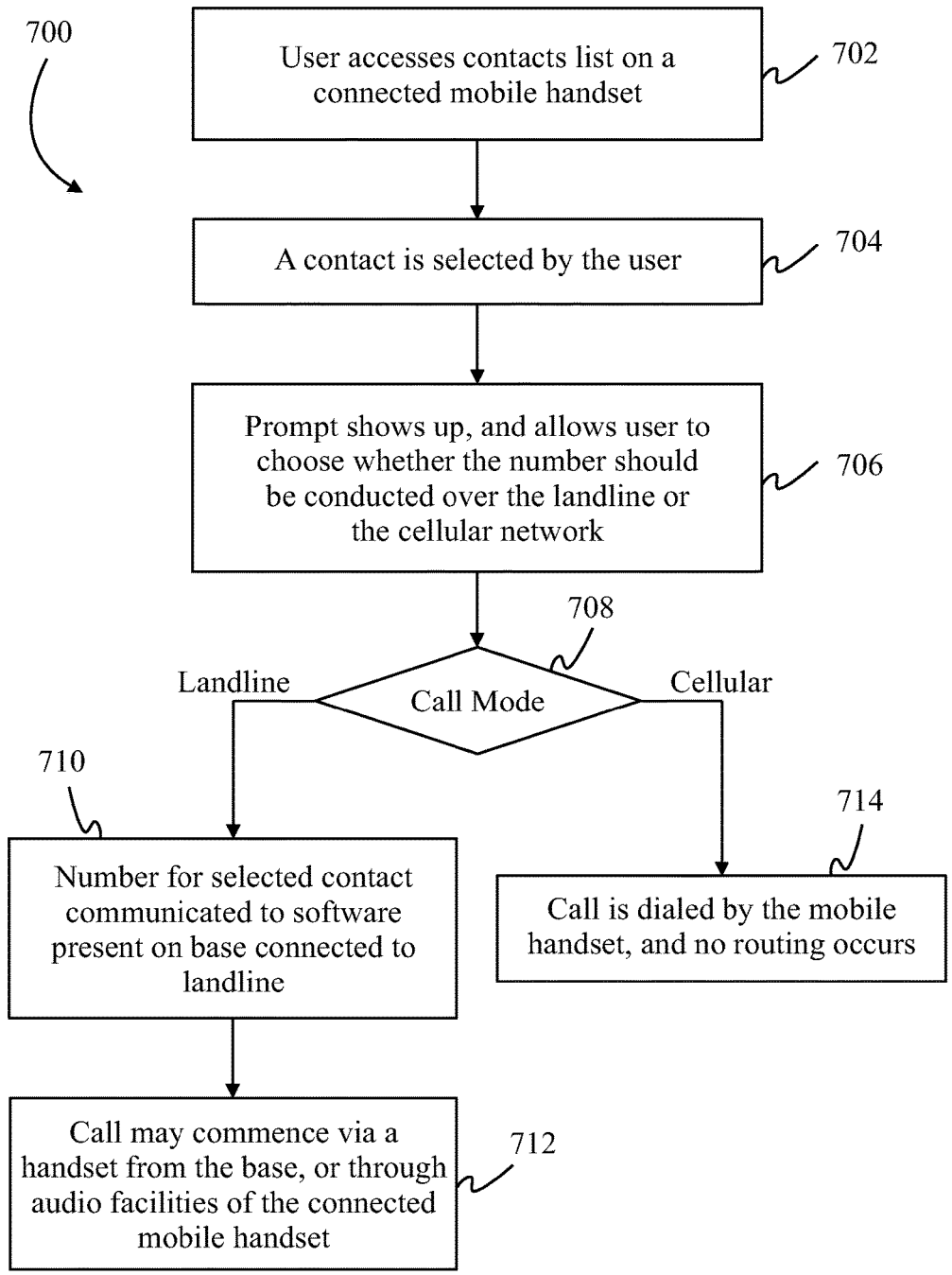
FIG. 7 is a flowchart for a method of dialing a contact as a built-in function of a mobile cellular device according to one embodiment of the present invention.

FIG. 7 is a flowchart 700 detailing steps for conducting a call using a mobile device and a smart telephone landline base in which the function is built into the mobile device's operating system according to one embodiment of the present invention. It should be understood that the steps of flowchart 600 take place after an initial setup procedure, as detailed in another part of the present specification. At step 702, a user of the mobile device accesses their contact list stored in the mobile device's memory. At step 704, the user selects a contact that is to be dialed. At step 706, a prompt may be displayed, and presents the user with the options in which they may contact the selected contact. The prompt may contain other information about the selected contact as well, including contact phone number, contact picture, and a way to enable editing of the selected contact. At step 708, the user may make a choice on how to complete the call. If the user chooses to complete the call via landline, step 710 is reached. At this step, the number that is to be dialed is communicated to the smart telephone landline base. At step 712, the call commences in a manner similar to what can be seen in steps 612-618.

Returning to step 708, should the user choose to conduct the call over the cellular network, step 714 is reached. At this step, the mobile device functions as usual, and it handles the entirety of the call. An example of a scenario in which this is preferable is when the user needs to place and call, while planning to leave the premises where the smart base may be located.

It will be apparent to one with skill in the art that the embodiments described above are specific examples of a single broader invention which may have greater scope than any of the singular descriptions taught. There may be many alterations made in the descriptions without departing from the spirit and scope of the present invention.

The invention claimed is:

1. A system for telephone communication, comprising:
   a landline-connected telephone having a landline connection to a publicly-switched telephone network, a first processor executing coded instructions from a non-transitory data storage medium, a first microphone, a first speaker, and wireless communication circuitry supporting communication with devices external to the landline connected-telephone; and
   a cellular telephone, external to the landline-connected telephone, the cellular telephone having a second processor executing a software application, wireless communication circuitry other than the cellular network supporting communication with the landline-connected telephone, a second microphone, a second speaker, and a cellular network connection;
   wherein, through execution of the software application on the processor at the cellular telephone, a caller selects a contact from a contact list stored on the cellular telephone, and is presented with a prompt enabling the caller to select whether to place a call to the contact via the cellular network, or to place the call via the landline-connected telephone, and wherein, if the caller selects the cellular network the call is placed on the cellular network, and wherein, if the caller selects the landline-connected telephone, a telephone number for the contact is generated, and transmitted to the landline-connected telephone via the wireless communication circuitry, where the where the call is placed via the landline connection of the landline telephone.

2. The system for telephone communication of claim 1, wherein, when the choice is to place the call over the landline connection, once the number is dialed, and a call is connected, voice communication is directly conducted via a microphone and speaker of the remote communication device and a destination represented by the telephone number.

3. The landline connected telephone system for telephone communication of claim 1 wherein the wireless communication circuitry is one of Bluetooth™ or WiFi.

4. A method for dialing and conducting a telephone call, comprising the steps:
   selecting by a caller, through execution of a software application on a processor at a cellular telephone coupled to a cellular network, a contact stored on a contact list at the cellular telephone;
   selecting by the caller, through a prompt displayed to the caller at the cellular telephone, whether to place a call to the contact by the cellular telephone via a cellular network, or to place the call via the landline-connected telephone;
   in the event the caller selects the cellular network, placing the call via the cellular network:
   in the event the caller selects the landline telephone, generating a telephone number for the call, and transmitting the number to the landline telephone via the wireless communication circuitry, where the call is placed via the landline connection.

5. The method of claim 4, wherein the wireless communication circuitry is one of Bluetooth™ or WiFi.

* * * * *